United States Patent
Yang (10) Patent No.: US 11,430,326 B2
(45) Date of Patent: Aug. 30, 2022

(54) WIRELESS COMMUNICATION-BASED SYSTEM FOR MANAGING LUBRICATING OIL INJECTION APPARATUS

(71) Applicant: KLT CO., LTD., Paju-Si (KR)

(72) Inventor: Yun Jong Yang, Seoul (KR)

(73) Assignee: KLT CO., LTD.

( * ) Notice: Subject to any disclaimer, the term of this patent is extended or adjusted under 35 U.S.C. 154(b) by 0 days.

(21) Appl. No.: 17/385,148

(22) Filed: Jul. 26, 2021

(65) Prior Publication Data

US 2021/0350696 A1     Nov. 11, 2021

Related U.S. Application Data

(63) Continuation of application No. PCT/KR2020/001416, filed on Jan. 30, 2020.

(30) Foreign Application Priority Data

Feb. 15, 2019    (KR) ........................ 10-2019-0017515

(51) Int. Cl.
    *G08C 17/02*          (2006.01)
    *H04W 4/38*           (2018.01)
    *G01D 21/02*          (2006.01)

(52) U.S. Cl.
    CPC ............. *G08C 17/02* (2013.01); *G01D 21/02* (2013.01); *H04W 4/38* (2018.02)

(58) Field of Classification Search
    CPC ........ G08C 17/02; G01D 21/02; G06Q 50/10; H04W 4/38; H04W 4/023; H04W 4/80;
(Continued)

(56) References Cited

U.S. PATENT DOCUMENTS 6,101,427 A * 8/2000 Yang ...................... F16N 29/02
                                                       700/239
6,123,174 A * 9/2000 Elkin .................. F01M 11/0458
                                                      123/196 S
(Continued)

FOREIGN PATENT DOCUMENTS

KR         10-1063018 B1     9/2011
KR    10-2011-0133746 A    12/2011
(Continued)

OTHER PUBLICATIONS

Korean Office Action (KR 10-2019-0017515), KIPO, dated Jun. 17, 2019.
(Continued)

*Primary Examiner* — Adnan Aziz
(74) *Attorney, Agent, or Firm* — Park & Associates IP Law, P.C.

(57) ABSTRACT

Proposed is a wireless communication-based system for managing a lubricating oil injection apparatus, the system including: a lubricating oil injection apparatus being installed in an industrial mechanical apparatus and automatically operating in a situational manner, thereby injecting lubricating oil; a monitoring unit being installed in the lubricating oil injection apparatus, checking a state thereof, generating a first signal containing information on the checked state, and transmitting the generated first signal to the outside through wireless communication; a user terminal receiving the first signal from the monitoring unit, outputting the information on the checked state, the information being contained in the first signal, and transmitting the first signal to the outside; a management server receiving the first signal from the user terminal; and a database receiving the first signal from the management server and storing the
(Continued)

received first signal on a per lubricating oil injection apparatus basis.

13 Claims, 8 Drawing Sheets

(58) Field of Classification Search
CPC ........ F16N 29/02; F16N 2230/00; F16N 9/04; F16N 11/08
See application file for complete search history.

(56) References Cited

U.S. PATENT DOCUMENTS

| | | | |
|---|---|---|---|
| 11,199,293 B2* | 12/2021 | Gibson | F16N 29/02 |
| 2010/0312601 A1* | 12/2010 | Lin | G06Q 10/08 705/308 |
| 2016/0334058 A1* | 11/2016 | Yang | F16N 11/08 |
| 2017/0159713 A1* | 6/2017 | Ito | F16N 29/02 |
| 2018/0051442 A1* | 2/2018 | Igarashi | E02F 9/2054 |
| 2020/0157983 A1* | 5/2020 | Hirai | F04B 49/065 |
| 2020/0201979 A1* | 6/2020 | Sagawa | F04B 49/065 |
| 2021/0018001 A1* | 1/2021 | Stewart | F16N 29/00 |

FOREIGN PATENT DOCUMENTS

| | | |
|---|---|---|
| KR | 10-2013-0136623 A | 12/2013 |
| KR | 10-2014-0059492 A | 5/2014 |
| KR | 10-1879627 B1 | 7/2018 |
| KR | 10-1903184 B1 | 10/2018 |
| KR | 10-2010757 B1 | 8/2019 |

OTHER PUBLICATIONS

Korean Notice of Allowance (KR 10-2019-0017515), KIPO, dated Aug. 6, 2019.
International Search Report (PCT/KR2020/001416), WIPO, dated May 12, 2020.

* cited by examiner

FIG. 8

WIRELESS COMMUNICATION-BASED SYSTEM FOR MANAGING LUBRICATING OIL INJECTION APPARATUS

REFERENCE TO RELATED APPLICATIONS

This is a continuation of International Patent Application to PCT/KR2020/001416 filed on Jan. 30, 2020, which designates the United States and claims priority of Korean Patent Application No. 10-2019-0017515 filed on Feb. 15, 2019, the entire contents of which are incorporated herein by reference.

FIELD OF THE INVENTION

The present invention relates to a wireless communication-based system for managing a lubricating oil injection apparatus.

BACKGROUND OF THE INVENTION

An industrial mechanical apparatus generates various motions. Thus, mechanical friction occurs between each of the connection portions of the industrial mechanical apparatus. Usually, lubricating oil is supplied between each of the connection portions, and thus the friction therebetween is reduced.

Types of industrial mechanical apparatuses include a mechanical manufacturing apparatus that is installed in a production factory and performs a specific process. An operator checks a lubrication state of the mechanical manufacturing apparatus and injects lubricating oil between respective borders of the mechanical manufacturing apparatus portions of which lubrication states are poor using a lubricating oil injection apparatus. In this manner, the lubrication state of the mechanical manufacturing apparatus can be kept proper. However, the larger and the more complicated the mechanical manufacturing apparatuses are, the more difficult it is for the operator to inject lubricating oil and the longer it takes to perform an operation of injecting the lubricating oil.

In order to alleviate the problem with this lubricating oil injection method in the related art, a recent trend is to install the lubricating oil injection apparatus in the mechanical manufacturing apparatus. Then, in a case where a specific condition is satisfied, the lubricating oil injection apparatus operates, and thus lubricating oil is injected.

Figure 1:
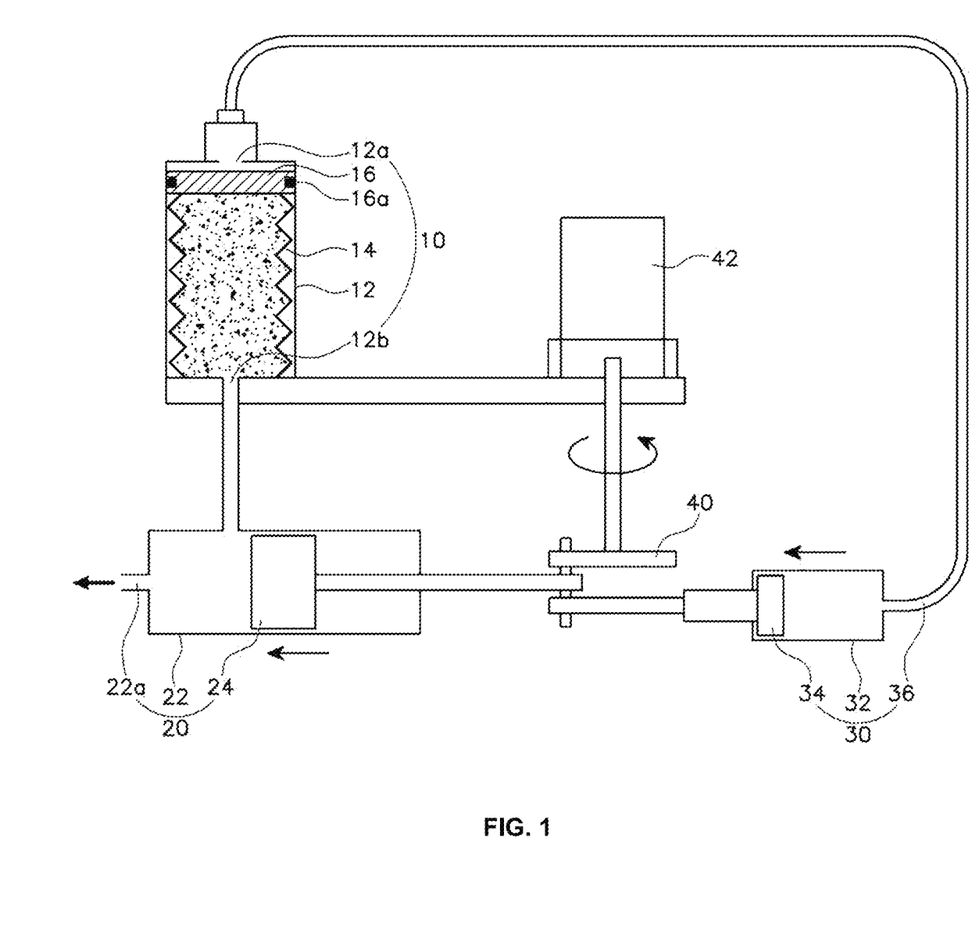
FIG. 1 is a schematic view illustrating a lubricating oil injection apparatus in the related art.

FIG. 1 is a view that, as an example of the lubricating oil injection apparatus using this method, schematically illustrates a lubricating oil supplying apparatus of air pressing type (Korean Patent No. 10-1063018, published on Sep. 6, 2011) a patent on which was granted to the applicant of the present application. A lubricating oil supplying apparatus 100 will be briefly described below with reference to FIG. 1.

As illustrated in FIG. 1, the lubricating oil supplying apparatus 100 may include a lubricating oil storage means 10, a lubricating oil supply means 20, an air pump 30, and a cam 40.

As illustrated in FIG. 1, lubricating oil is stored in the lubricating oil storage means 10. An ascending and descending pressing piston 16 is provided within the lubricating oil storage means 10. An inlet 12a through which air is injected is formed in an upper portion of the lubricating oil storage means 10, and an outlet 12b through the lubricating oil is discharged is formed therein.

The lubricating oil discharged from the lubricating oil storage means 10 is introduced into the lubricating oil supply means 20. The lubricating oil supply means 20 discharges the lubricating oil through a discharging outlet 22a using a lubricating oil piston 24, and thus the lubricating oil is introduced into a mechanical apparatus that needs to be supplied with lubricating oil.

In addition, as another example of the lubricating oil injection apparatus, there is an oil injection apparatus (Korean Patent No. 10-1903184, published on Oct. 1, 2018) a patent on which was granted to the applicant of the present application. This oil injection apparatus is capable of compressing and discharging lubricating oil and at the same time enabling a plurality of discharging pumps to perform sequential pumping using a single power source. Furthermore, the oil injection apparatus has a clutch function for dealing with a change in pressure of the lubricating oil due to concurrent performing of the compressing and discharging and the pumping.

Various products that perform various functions have been developed such as the above-described lubricating oil injection apparatuses. However, this lubricating oil injection apparatus installed in a mechanical manufacturing apparatus operates individually and independently due to characteristics thereof. Thus, there is a need to periodically check a state of the lubricating oil injection apparatus, such as whether or not an amount of lubricating oil remains in the lubricating oil injection apparatus, and to maintain the lubricating oil injection apparatus. Checking and maintaining jobs are difficult to perform in a case where there are a large number of lubricating oil injection apparatuses or where the lubricating oil injection apparatus is installed in a place which an operator cannot easily visit.

SUMMARY OF THE INVENTION

An objective of the present invention, which is made in view of the above-described problems, is to provide a wireless communication-based system for managing a lubricating oil injection apparatus. In this wireless communication-based system for managing a lubricating oil injection apparatus, an operator can easily recognize a state of a lubricating oil injection apparatus that is installed for operation in an industrial mechanical apparatus and, at the same time, can easily control the lubricating oil injection apparatus, thereby maintaining the lubricating oil injection apparatus in an easier manner.

In order to solve the problems as described above, according to an aspect of the present invention, there is provided a wireless communication-based system for managing a lubricating oil injection apparatus, the wireless communication-based system including: a lubricating oil injection apparatus being installed in an industrial mechanical apparatus and automatically operating in a situational manner, thereby injecting lubricating oil; a monitoring unit being installed in the lubricating oil injection apparatus, checking a state of the lubricating oil injection apparatus, generating a first signal containing information on the checked state of the lubricating oil injection apparatus, and transmitting the generated first signal to the outside through wireless communication; a user terminal receiving the first signal from the monitoring unit, outputting the information on the checked state of the lubricating oil injection apparatus, the information being contained in the first signal, and transmitting the first signal to the outside; a management server receiving the first signal from the user terminal; and a database receiving the first signal from the management server and storing the received first signal on a per lubricating oil injection apparatus basis.

The wireless communication-based system may further include: a first controller being installed in the user terminal, generating a control signal for operating the lubricating oil injection apparatus according to a user's operation or a setting change signal for changing a setting of the lubricating oil injection apparatus, and then transmitting the generated control signal or the generated setting changing signal to the lubricating oil injection apparatus; and a second controller being installed in the lubricating oil injection apparatus, receiving the control signal or the setting change signal from the first controller and operating the lubricating oil injection apparatus or changing the setting of the lubricating oil injection apparatus, wherein the monitoring unit may generate history information on a control operation according to which the second controller operates the lubricating oil injection apparatus or information on completion of the changing of the setting of the lubricating oil injection apparatus and including the history information or the information on the completion in the first signal.

In the wireless communication-based system, the monitoring unit and the user terminal may communicate with each other through one of Bluetooth, Zigbee, and Wireless Fidelity (Wi-Fi).

In the wireless communication-based system, the state checked by the monitoring unit, of the lubricating oil injection apparatus may indicate at least one of information on an amount of power remaining in a battery in the lubricating oil injection apparatus, a warning on overload on a motor in the lubricating oil injection apparatus, information on an amount of remaining lubricating oil, and an alert to finished supplying of lubricating oil.

In the wireless communication-based system, the management server may predict an estimated lubricating oil supplying interruption date for the lubricating oil injection apparatus or an estimated complete discharging date for the battery using state information that is stored on a per lubricating oil injection apparatus basis in the database and may transmit the predicted estimated lubricating oil supplying interruption date for the lubricating oil injection apparatus or the predicted estimated complete discharging date for the battery to the user terminal.

In the wireless communication-based system, together with one of a warning on overload on a motor in the lubricating oil injection apparatus and an alert to finished supplying of lubricating oil in the first signal, the monitoring unit may include a point in time at which each of the warning and the alert occurs and a time that elapses after each of the warning and the alert occurs.

In the wireless communication-based system, in a case where the state information stored on a per lubricating oil injection apparatus basis in the database is not updated for a predetermined time, the management server may transmit to the user terminal a second signal alerting the user terminal to the fact that the state information on a per lubricating oil injection apparatus basis is not updated for the predetermined time.

In the wireless communication-based system, the user terminal may recognize a location of the lubricating oil injection apparatus through intensity and a direction of a wireless communication signal that is transmitted and received to and from the lubricating oil injection apparatus and may output the recognized location of the lubricating oil injection apparatus.

The wireless communication-based system may further a signal generator relaying the first signal that is communicated between the monitoring unit and the user terminal.

In the wireless communication-based system, the lubricating oil injection apparatus and the signal generator may communicate with each other through short-distance wireless communication, and the signal generator and the user terminal may communicate with each other through short-distance wireless communication or the wireless Internet.

In the wireless communication-based system, the signal generator may recognize a location of the lubricating oil injection apparatus through intensity and a direction of a short-distance wireless communication signal that is transmitted and received to and from the lubricating oil injection apparatus, may generate a third signal containing information on the recognized location of the lubricating oil injection apparatus, and may transmit the generated third signal to the user terminal.

The wireless communication-based system may further include a lubrication-state measurement unit being installed on a portion of an industrial mechanical apparatus, with friction occurring on the portion thereof, checking a lubrication state thereof, and transferring information on the checked lubrication state to the user terminal.

In the wireless communication-based system, the lubrication-state measurement unit may detect one or more signals selected from among signals representing electric conductivity, noise, and vibration and may check the lubrication state of the portion of the industrial mechanical apparatus using the detected one or more signals, with the friction occurring on the portion thereof.

In the wireless communication-based system, the lubrication-state measurement unit may include: a first electrode being installed on one of a first member and a second member which are included in the industrial mechanical apparatus, in such a manner as to be positioned a distance apart from each other, with friction occurring between the first and second members when the first and second members are brought into contact with each other; a second electrode being installed on one on which the first electrode is not installed, of the first and second members and being situationally brought into contact with the first electrode; and an electric conductivity measurement unit measuring electric conductivity that is a flow of current between the first electrode and the second electrode when the first electrode and the second electrode are brought into contact with each other.

In the wireless communication-based system for managing a lubricating oil injection apparatus according to the present invention, as described above, a user terminal and a lubricating oil injection apparatus are capable of communicating with each other on the spot through a short-distance wireless communication scheme, such as Bluetooth or Zigbee. Thus, the wireless communication-based system provides an advantageous effect in which a user can check a state of the lubricating oil injection apparatus and can control the lubricating oil injection apparatus using the user terminal.

In addition, according to the present invention, information on the lubricating oil injection apparatus that is transferred to the user terminal is transferred to a management server, and the management server stores the information on a per lubricating oil injection apparatus basis in a database, thereby continuously maintaining the database. Thus, the wireless communication-based system provides an advantageous effect in which the user can easily manage the lubricating oil injection apparatus over a long period of time.

In addition, according to the present invention, the management server sends to the user terminal a signal for indicating a lubricating oil injection apparatus on which information is not updated for a predetermined time among pieces of information that are stored on a per lubricating oil injection apparatus in the database. Accordingly, the user is reminded about the lubricating oil injection apparatus on which information is not updated for the predetermined time. Thus, the wireless communication-based system provides an advantageous effect in which all lubricating oil injection apparatuses can be maintained periodically.

In addition, according to the present invention, together with a warning on overload on a motor in the lubricating oil injection apparatus or an alert to finished supplying of lubricating oil to the user terminal, a monitoring unit installed in the lubricating oil injection apparatus transmits a point in time at which each of the warning and the alert occurs and a time that elapses after each of the warning and the alert occurs. Thus, the wireless communication-based system provides an advantageous effect in which the user can take appropriate action when the warning or the alert occurs.

In addition, according to the present invention, a signal generator receives information on the state of the lubricating oil injection apparatus while communicating with the lubricating oil injection apparatus through the short-distance wireless communication. Furthermore, the signal generator receives the information on the state of the lubricating oil injection apparatus while communicating with the user terminal through the wireless Internet. Thus, the wireless communication-based system provides an advantageous effect in which the user can check the state of the lubricating oil injection apparatus and control the lubricating oil injection apparatus without the need to go to the physical location where the lubricating oil injection apparatus is installed.

In addition, according to the present invention, the user terminal or the signal generator predicts a location of the lubricating oil injection apparatus using intensity and a direction of a signal that is transmitted and received to and from the lubricating oil injection apparatus and transmits information on the predicted location of the lubricating oil injection apparatus to the user terminal. Thus, the wireless communication-based system provides an advantageous effect in which the user can manage the lubricating oil injection apparatus in an easier manner.

In addition, according to the present invention, a lubrication-state measurement unit acquires information on a lubrication state of an industrial mechanical apparatus in which the lubricating oil injection apparatus is installed, and the acquired information is utilized for management of the lubricating oil injection apparatus. Thus, the wireless communication-based system provides an advantageous effect in which the user can manage the lubricating oil injection apparatus in a more efficient manner.

DETAILED DESCRIPTION OF THE INVENTION

A wireless communication-based system for managing a lubricating oil injection apparatus according to desired embodiments of the present invention will be described below with reference to the accompanying drawings.

First Embodiment

Figure 2:
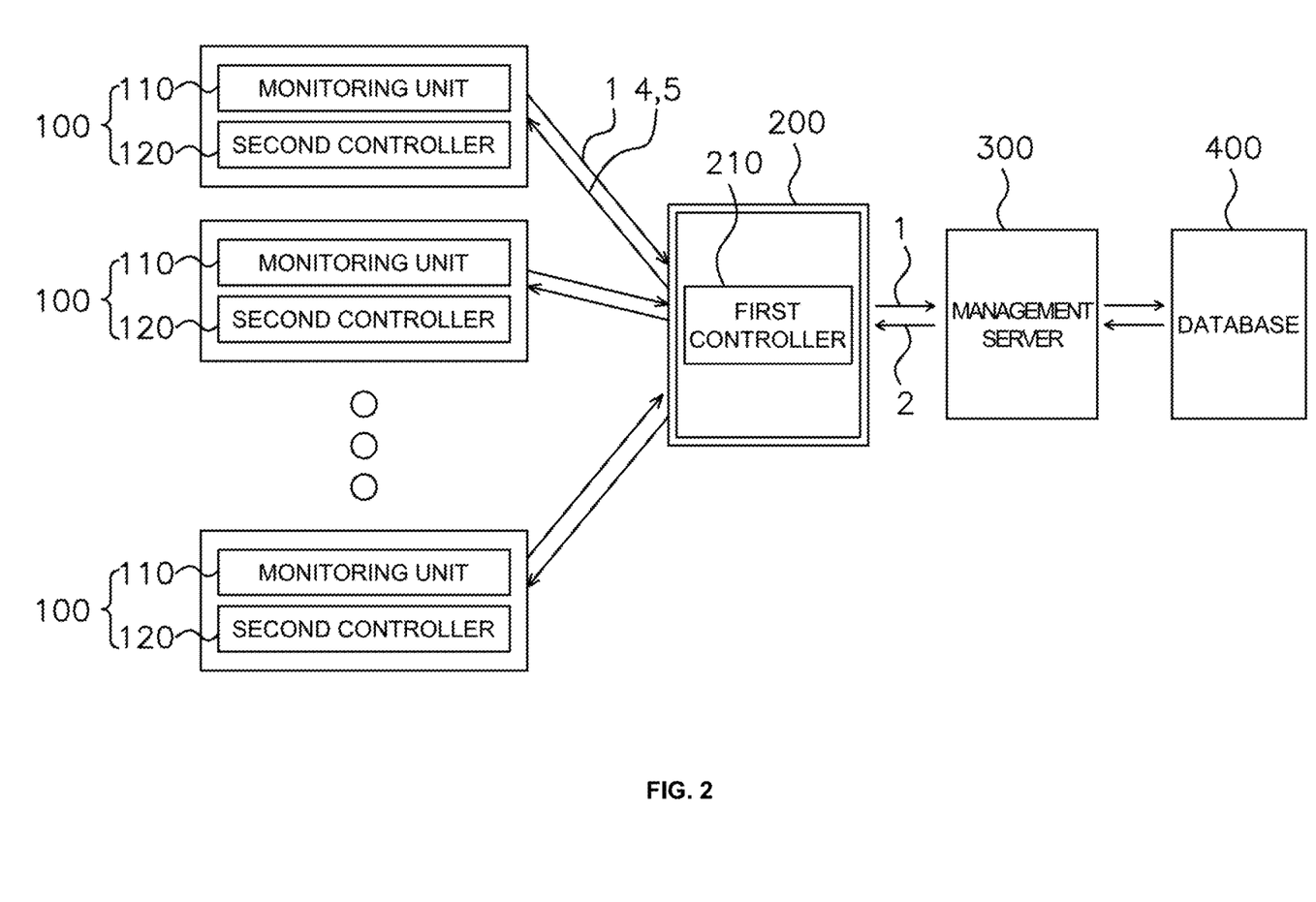
FIG. 2 is a block diagram illustrating a wireless communication-based system for managing a lubricating oil injection apparatus according to a first embodiment of the present invention.

As illustrated in FIG. 2, a wireless communication-based system for managing a lubricating oil injection apparatus according to a first embodiment of the present invention may include a lubricating oil injection apparatus 100, a monitoring unit 110, a user terminal 200, a management server 300, and a database 400.

The lubricating oil injection apparatus 100 illustrated in FIG. 2 is installed in an industrial mechanical apparatus and operates automatically in a situational manner to inject lubricating oil. Examples of the lubricating oil injection apparatus 100 according to the present embodiment may include various types of lubricating oil injection apparatuses.

For example, the above-described lubricating oil injection apparatus 100 in the related art may discharge lubricating oil periodically according to a setting or may operate under a specific condition. At this point, the specific condition under which the above-described lubricating oil injection apparatus 100 may be set up according to a lubrication state of the industrial equipment in which the lubricating oil injection apparatus 100 is installed.

From the above description, it can be known that a space (a lubricating oil storage means 10) for storing lubricating oil, and an operating mechanism for discharging lubricating oil are integral elements of the lubricating oil injection apparatus 100 according to the present embodiment. In order to manage the space for storing the lubricating oil, and the operating mechanism for discharging the lubricating oil, the wireless communication-based system for managing a lubricating oil injection apparatus according to the first embodiment of the present invention additionally includes other constituent elements: the monitoring unit 110; the user terminal 200; the management server 300; and the database 400.

The monitoring unit 110 illustrated in FIG. 1 is installed in the lubricating oil injection apparatus 100 and checks a state of the lubricating oil injection apparatus 100. Therefore, the monitoring unit 110 may further include various sensing means for checking the state of the lubricating oil injection apparatus 100. The state of the lubricating oil injection apparatus 100 that is checked by the sensing means included in the monitoring unit 110 indicates at least one of an amount of lubricating oil remaining in the lubricating oil storage space, occurrence or non-occurrence of overload on the motor 42 included in the operating mechanism, an amount of power remaining in a battery, and finished supplying or in-progress supplying of lubricating oil. Together with a warning on the overload occurring on the motor 42 included in the operating mechanism of the lubricating oil injection apparatus 100 or an alert to finished supplying of lubricating oil in a first signal 1, the monitoring unit 110 includes a point in time at which the overload on the motor 42 occurs or the supplying of lubricating oil is finished and a time that elapses after the overload occurs or after the supplying is finished. Thus, a user of the user terminal 200 can take appropriate action.

The monitoring unit 110 may include a wireless communication module in order to transmit the first signal 1 to the outside. The monitoring unit 110 generates the first signal 1 containing information on the state of the lubricating oil injection apparatus 100 that is checked as described above and transmits the generated first signal 1 to the outside through wireless communication.

As illustrated in FIG. 1, the wireless communication-based system for managing a lubricating oil injection apparatus according to the first embodiment of the present invention includes a plurality of the lubricating oil injection apparatuses 100. A plurality of the monitoring units 110 are correspondingly installed within the lubricating oil injection apparatus 100. However, according to the present invention, the number of the lubricating oil injection apparatuses 100 and the number of the monitoring units 110 that are paired with the lubricating oil injection apparatuses 100, respectively, are not limited to the numbers thereof in FIG. 1.

The user terminal 200 illustrated in FIG. 1 receives the first signal 1 from the above-described monitoring unit 110 and outputs the information on the state of the lubricating oil injection apparatus 100, which is included in the first signal 1. Thus, the user can know the state of the lubricating oil injection apparatus 100 in an easier manner from the output information on the state of the lubricating oil injection apparatus 100. The user terminal 200 may be a general-purpose electronic device, such as a smartphone, on which an application capable of performing operations according to the present invention is installed.

The user of the user terminal 200 may be a management staff member for a company that provides a service using the wireless communication-based system for managing a lubricating oil injection apparatus according to the first embodiment of the present invention and may be a management staff member for a company, as a customer, that uses the wireless communication-based system for managing a lubricating oil injection apparatus according to the first embodiment of the present invention.

The user terminal 200 and the lubricating oil injection apparatus 100 that are illustrated in FIG. 1 need to be located within a reference distance apart from each other. The reason for this is because the monitoring unit 110 installed in the lubricating oil injection apparatus 100 and the user terminal 200 communicate with each other through short-distance wireless communication. In the wireless communication-based system according to the first embodiment, one of Bluetooth, Zigbee, and Wireless Fidelity (Wi-Fi) may be used for the short-distance wireless communication. In a case where the Bluetooth standard is used for the short-distance wireless communication in the wireless communication-based system according to the first embodiment, the lubricating oil injection apparatus 100 and the user terminal 200 in theory, even when located 50 to 100 m apart, are capable of communicating with each other. However, when considering the presence of a wall or an obstacle between the lubricating oil injection apparatus 100 and the user terminal 200, it is desirable that the lubricating oil injection apparatus 100 and the user terminal 200 are located 10 to 20 m apart.

The user may approach the lubricating oil injection apparatus 100 with the user terminal 200 held in his/her hand and may make a request for paring with the lubricating oil injection apparatus 100. In a case where the user terminal 200 is paired with a specific lubricating oil injection apparatus 100, the user terminal 200 may record this pairing activity. Thereafter, when the user approaches the specific lubricating oil injection apparatus 100, the user terminal 200 may be paired with the specific lubricating oil injection apparatus 100 only by performing a wireless communication function. A single lubricating oil injection apparatus 100 is paired with a single user terminal 200 in a one-to-one correspondence with each other. Thus, a plurality of the lubricating oil injection apparatuses 100 may be sequentially connected to a plurality of user terminals 200. In a different way, the plurality of the lubricating oil injection apparatus 100 may be concurrently connected to a single user terminal 200 through a Bluetooth multi-point function of connecting a plurality of devices to a single device.

A Bluetooth communication module built into each of the lubricating oil injection apparatus 100 and the user terminal 200 uses Bluetooth 4.0 and supports Bluetooth low energy (BLE). BLE is a wireless personal area network technology intended to provide reduced power consumption while maintaining a communication range similar to that which Bluetooth classic maintains prior to the release of Bluetooth 4.0. When considering the feature of the lubricating oil injection apparatus 100 that is independently installed and individually operates, the use of BLE minimizes an amount of a battery power consumed to drive the operating mechanism of the lubricating oil injection apparatus 100. Thus, the operating time of the lubricating oil injection apparatus 100 can be maximally extended.

The operation of the user terminal 200, as described above, is performed to recognize the state of the lubricating oil injection apparatus 100. The user terminal 200 operates to check the state of the lubricating oil injection apparatus 100. Moreover, as illustrated in FIG. 1, the user terminal 200 may include a first controller 210. Thus, using the user terminal 200, the wireless communication-based system for managing a lubricating oil injection apparatus according to the first embodiment of the present invention may control operation of the lubricating oil injection apparatus 100 and at the same time, may change a setting of the lubricating oil injection apparatus 100.

As illustrated in FIG. 1, the first controller 210 may generate and transmit a control signal 4 for operating the lubricating oil injection apparatus 100 according to a user's operation or may generate and transmit a setting change signal 5 for changing the setting of the lubricating oil injection apparatus 100.

The lubricating oil injection apparatus 100 may include a second controller 120. The second controller 120 receives the control signal 4 or the setting change signal 5 and controls the lubricating oil injection apparatus 100 according to the control signal 4 or changes the setting of the lubricating oil injection apparatus 100 according to the setting change signal 5. Examples of control information contained in the control signal 4 include the operation or non-operation of the lubricating oil injection apparatus 100 and an amount of lubricating oil that is to be injected when the lubricating oil injection apparatus 100 operates. Examples of setting change information contained in the setting change signal 5 include a lubricating oil injection periodicity for the lubricating oil injection apparatus 100 and an amount of lubricating oil that is to be injected when the lubricating oil injection apparatus 100 operates periodically.

The second controller 120 controls the lubricating oil injection apparatus 100 according to the control signal 4 or changes the setting of the lubricating oil injection apparatus 100 according to the setting change signal 5. Thereafter, the monitoring unit 110 contains history information on a control operation or information on completion of the changing of the setting in the first signal 1. Thus, the user of the user terminal 200 that receives the first signal 1 may verify that the lubricating oil injection apparatus 100 is completely controlled or set according to the control signal 4 or the setting change signal 5, respectively.

As illustrated in FIG. 1, when receiving the first signal 1 from the lubricating oil injection apparatus 100, the user terminal 200 may transmit the received first signal 1 to the management server 300. However, information for identifying the lubricating oil injection apparatus 100 for which the first signal 1 is generated may be included in the first signal 1 transferred from the user terminal 200 to the management server 300.

The management server 300 identifies the lubricating oil injection apparatus 100 for which the first signal 1 transmitted from the user terminal 200 is generated, through identification information contained in the first signal 1, and then stores the identification formation in the database 400. The management server 300 may receive the generated first signal 1 from the lubricating oil injection apparatus 100 installed in each of the industrial mechanical apparatuses of a plurality of customers and may store the received first signals 1 in the database 400 on a per-customer basis for sustainable management.

The management server 300 may predict an estimated lubricating oil supplying interruption date for the lubricating oil injection apparatus 100 or an estimated complete discharging date for a battery using a trend change in the state information on each of the lubricating oil injection apparatuses 100 that is stored in the database 400 and may transfer the estimated lubricating oil supplying interruption date or the estimated complete discharging date to the user terminal 200. Accordingly, the user can manage the lubricating oil injection apparatus 100 according to the estimated lubricating oil supplying interruption date or the estimated complete discharging date. More specifically, the process in which the management server 300 predicts the estimated complete discharging date for the battery using the state information on each of the lubricating oil injection apparatuses 100 that is stored in the database 400 is described as follows. The management server 300 may recognize an amount of power remaining in the battery in a specific lubricating oil injection apparatus 100 for a predetermined period of time from the current date to a date in the past and then may derive a trend change in the complete discharging of the battery. Then, the management server 300 may apply the derived trend change in the complete discharging of the battery to a current amount of power remaining in the battery in the specific lubricating oil injection apparatus 100 and thus may predict the estimated complete discharging date of the battery. In the same manner, the management server 300 may also predict the estimated lubricating oil supplying interruption date for the lubricating oil injection apparatus 100.

In addition, in a case where information on each of the lubricating oil injection apparatus 100 that is stored in the database 400 is not updated for a predetermined time, the management server 300 may transmit to the user terminal 200 a second signal 2 for alerting the user terminal 200 that the lubricating oil injection apparatus 100 needs to be checked, and thus the user of the user terminal 200 may check the lubricating oil injection apparatus 100.

The user terminal 200 may recognize a location at which the lubricating oil injection apparatus 100 is installed, using the intensity and direction of a signal that is transmitted or received to and from the lubricating oil injection apparatus 100. Particularly, while in motion, the user terminal 200 may recognize the location at which the lubricating oil injection apparatus 100 is installed, using a triangulation technique. This process is illustrated in FIG. 3.

Figure 3:
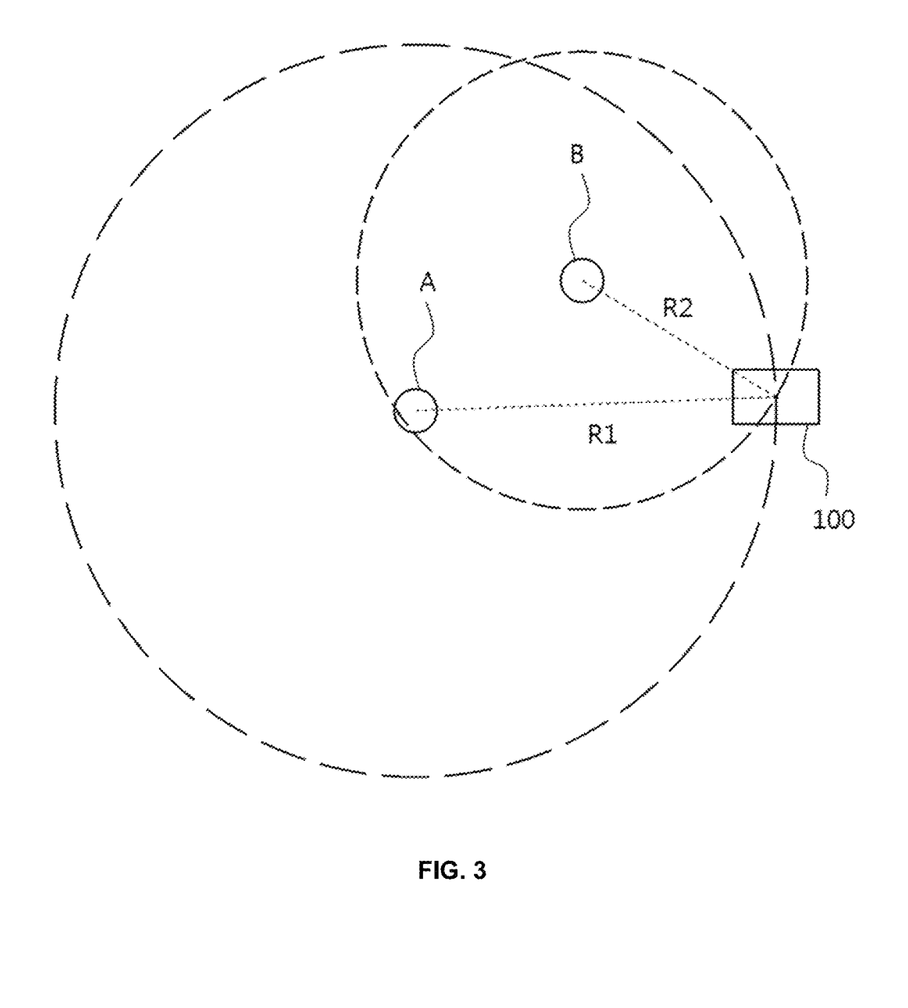
FIG. 3 is a schematic diagram illustrating that a user terminal recognizes a location of a lubrication oil injection apparatus in the wireless communication-based system for managing a lubricating oil injection apparatus according to the first embodiment of the present invention.

As illustrated in FIG. 3, it is assumed that, when the user terminal 200 communicates with the lubricating oil injection apparatus 100 at a location A that is located a distance of R1 apart from the lubricating oil injection apparatus 100, the intensity of a signal is S1. On this assumption, the user terminal 200 may obtain R1 using an equation describing the relation between the intensity of a signal and a distance. From FIG. 3, it can be known that if R1 is obtained, the lubricating oil injection apparatus 100 is located around a circle of which the center is the user terminal 200. Subsequently, while holding the user terminal 200 in his/her hand, the user moves to a B location that is located a distance of R2 apart from the lubricating oil injection apparatus 100 and again attempts to communicate with the lubricating oil injection apparatus 100. If the intensity of the signal at this time is assumed to be S2, the user terminal 200 may obtain R2 using the equation describing the relation between the intensity of the signal and the distance. When the process of obtaining R2 is repeated a predetermined number of times, circles of which the number corresponds to the predetermined number of times are drawn. It is predicted that the lubricating oil injection apparatus 100 is located at a place where the circles overlap. Therefore, the user of the user terminal 200 may manage the lubricating oil injection apparatus 100 in an easier manner through the use of information on the predicted location of the lubricating oil injection apparatus 100.

Second Embodiment and Third Embodiment

Wireless communication-based systems for managing a lubricating oil injection apparatus according to a second embodiment and a third embodiment of the present invention will be described in detail below with reference to the accompanying drawings. The wireless communication-based system for managing a lubricating oil injection apparatus according to the third embodiment of the present invention is the same in configuration as the wireless communication-based system for managing a lubricating oil injection apparatus according to the second embodiment of the present invention, except that the two wireless communication-based systems employ different communication schemes. The wireless communication-based system for managing a lubricating oil injection apparatus according to the second embodiment of the present invention is first described, and then the wireless communication-based system for managing a lubricating oil injection apparatus according to the third embodiment of the present invention is briefly described.

Figure 4:
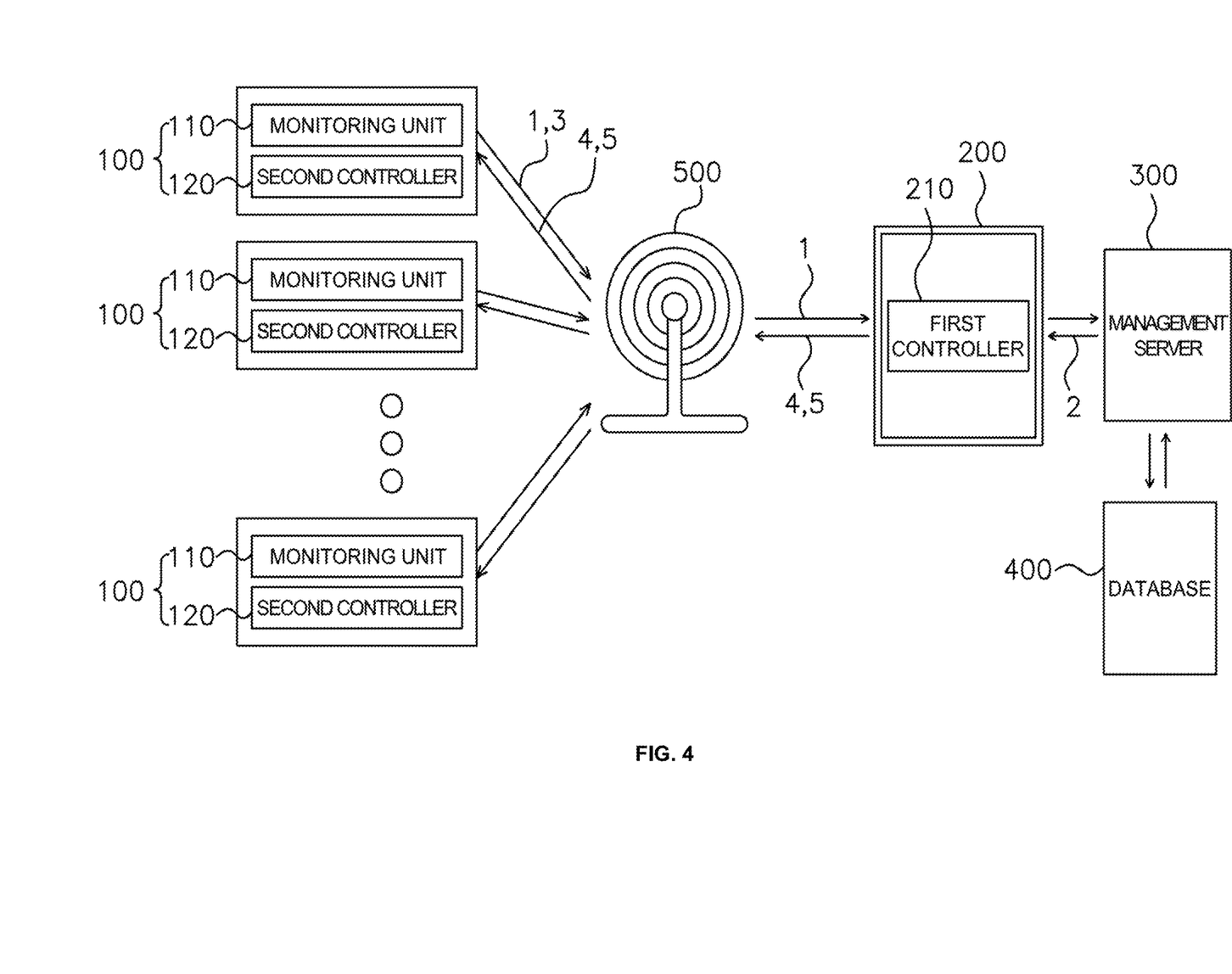
FIG. 4 is a block diagram illustrating a wireless communication-based system for managing a lubricating oil injection apparatus according to a second embodiment of the present invention.
Figure 5:
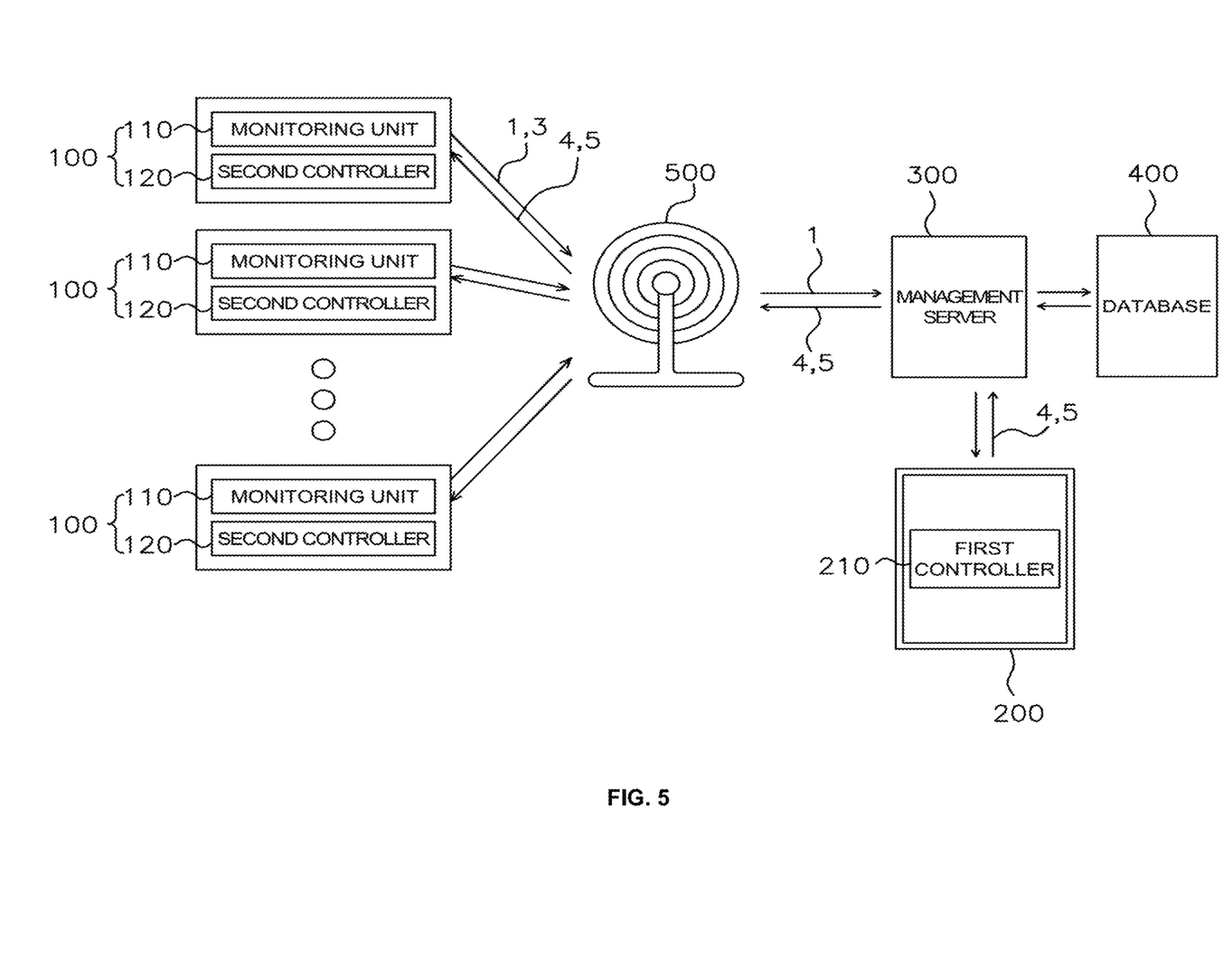
FIG. 5 is a block diagram illustrating a wireless communication-based system for managing a lubricating oil injection apparatus according to a third embodiment of the present invention.

FIG. 4 is a view schematically illustrating the wireless communication-based system for managing a lubricating oil injection apparatus according to the second embodiment of the present invention.

As illustrated in FIG. 4, a difference from the above-described wireless communication-based system for managing a lubricating oil injection apparatus according to the first embodiment of the present invention is that the wireless communication-based system for managing a lubricating oil injection apparatus according to the second embodiment of the present invention further includes a signal generator 500. Therefore, only the signal generator 500, which is not included in the wireless communication-based system for managing a lubricating oil injection apparatus according to the first embodiment, and constituent elements associated therewith are described. Other constituent elements of the wireless communication-based system for managing a lubricating oil injection apparatus according to the second embodiment are regarded as the same as those of the wireless communication-based system for managing a lubricating oil injection apparatus according to the first embodiment.

As illustrated in FIG. 4, the signal generator 500 is installed in the vicinity of the lubricating oil injection apparatus 100 and continuously generates a signal that is capable of being communicated to the lubricating oil injection apparatus 100. The signal generator 500 continuously receives the first signal 1 containing the information on the state of the lubricating oil injection apparatus 100 and stores pieces of information contained in the first signal 1 in a storage device installed within the signal generator 500. That is, the signal generator 500 serves as a type of beacon. In addition, the signal generator 500 is installed in such a manner as to communicate with the user terminal 200 and thus relays the first signal (1) that is communicated between the lubricating oil injection apparatus 100 and the user terminal 200. The signal generator 500 and the user terminal 200 communicate with each other through wired/wireless communication. Thus, information on the lubricating oil injection apparatus 100 that is stored in the storage device of the signal generator 500 may be transferred to the user terminal 200. Particularly, when the signal generator 500 and the user terminal 200 communicate with each other through the wireless Internet that is a network that employs a long-distance wireless communication scheme, the user may manage the lubricating oil injection apparatus 100 without the need to go to the physical location where the lubricating oil injection apparatus 100 is installed. Thus, user convenience can be increased.

In addition, the signal generator 500 may recognize the location of the lubricating oil injection apparatus 100 while communicating with the lubricating oil injection apparatus 100. The signal generator 500 may measure the intensity of the signal that is transmitted and received between the signal generator 500 and the lubricating oil injection apparatus 100, may specify a direction of the signal, and thus may recognize the location of the lubricating oil injection apparatus 100. The information on the location of the lubricating oil injection apparatus, which is recognized by the signal generator 500, may be expressed in terms of how far and in which direction the lubricating oil injection apparatus 100 being located from the signal generator 500. The signal generator 500 may generate a third signal 3 containing pieces of information on locations of the lubricating oil injection apparatuses 100 and then may transmit the generated third signal 3 to the user terminal 200. Accordingly, the user may recognize the location of the lubricating oil injection apparatus 100 in an easier manner and thus may manage the lubricating oil injection apparatus 100 in an easier manner.

As illustrated in FIG. 4, the information stored in the storage device of the signal generator 500 may be transferred to the management server 300 through the user terminal 200. However, the same scheme as in the wireless communication-based system for managing a lubricating oil injection apparatus according to the third embodiment may be employed. That is, the information stored in the storage device of the signal generator 500 may be transferred directly to the management server 300, and the management server 300 may store the received information on the lubricating oil injection apparatus 100 in the database 400. Accordingly, the user terminal 200 may make a connection to the management server 300 and may read information associated with the lubricating oil injection apparatus 100. In this case, the management server 300 may store the history on the user terminal 200's connection to the management server 300 and thus the reading of the information associated with the lubricating oil injection apparatus 100. In a case where the user terminal 200 does not read the information associated with the lubricating oil injection apparatus 100 through the management server 300 for a predetermined time, the management server 300 may transmit a signal alerting the user terminal 200 that the user terminal 200 does not read the information associated with the lubricating oil injection apparatus 100 for the predetermined time.

Fourth Embodiment

A wireless communication-based system for managing a lubricating oil injection apparatus according to a fourth embodiment of the present invention will be described below with reference to the accompanying drawings.

Figure 6:
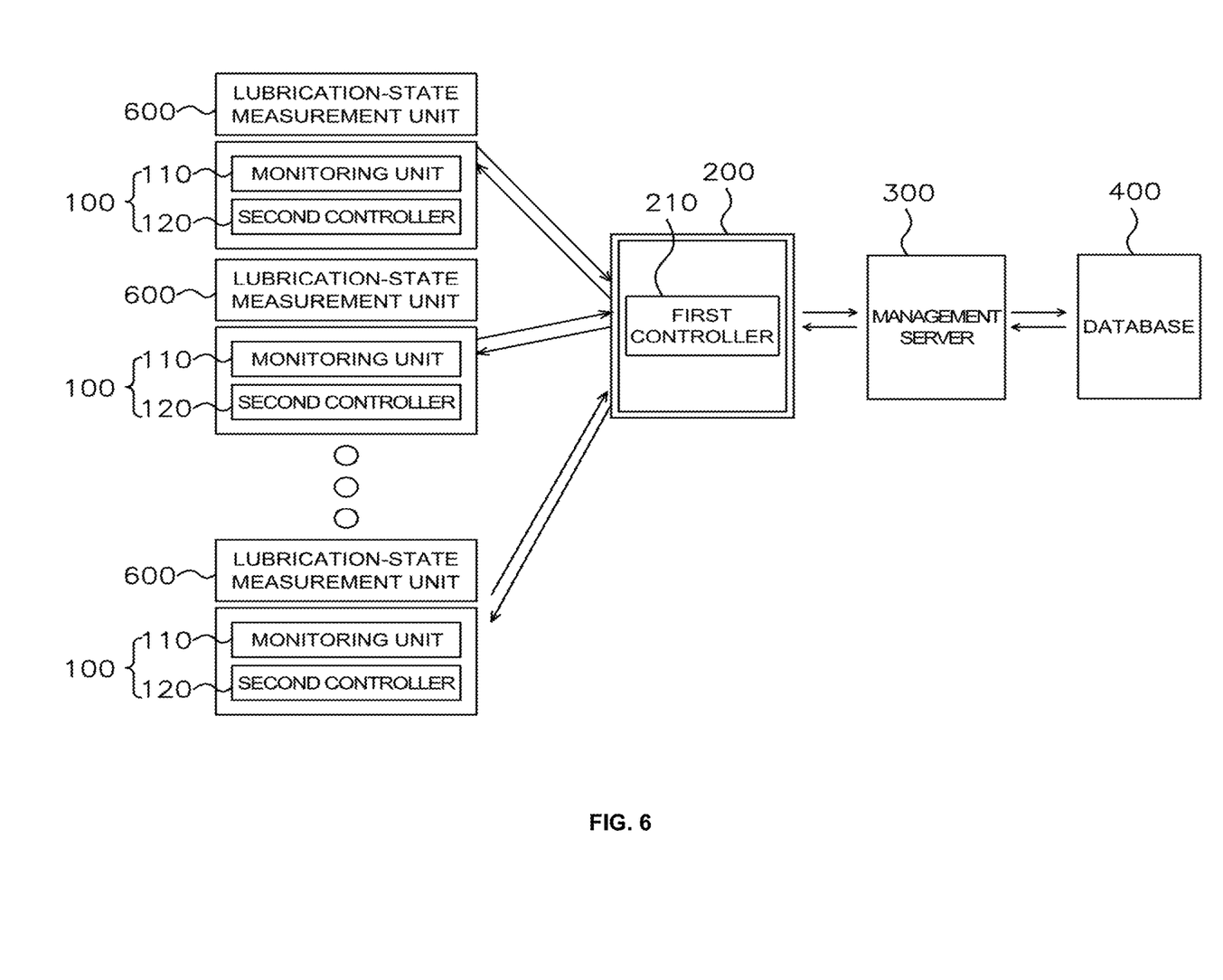
FIG. 6 is a block diagram illustrating a wireless communication-based system for managing a lubricating oil injection apparatus according to a fourth embodiment of the present invention.

FIG. 6 is a view schematically illustrating the wireless communication-based system for managing a lubricating oil injection apparatus according to the fourth embodiment of the present invention.

As illustrated in FIG. 6, in addition to the constituent elements of the wireless communication-based system for managing a lubricating oil injection apparatus according to the first embodiment of the present invention, the wireless communication-based system for managing a lubricating oil injection apparatus according to the fourth embodiment of the present invention includes a lubrication-state measurement unit 600. Only the lubrication-state measurement unit 600 and constituent elements associated therewith are described in detail. A constituent element of the wireless communication-based system for managing a lubricating oil injection apparatus according to the fourth embodiment, when it is the same as that of the wireless communication-based system for managing a lubricating oil injection apparatus according to the first embodiment, is given the same reference numeral or the same name as that thereof.

The lubrication-state measurement unit 600 is installed in a portion of the industrial mechanical apparatus where friction occurs, and checks a lubrication state of the portion thereof and transfers the lubrication state to the user terminal 200. The lubrication-state measurement unit 600 may check the lubrication state of the portion of the industrial mechanical apparatus where friction occurs in various ways and, more particularly, may check the lubrication state of the portion of the industrial mechanical apparatus where friction occurs by using one or more of electric conductivity, noise, and vibration. An example of the lubrication-state measurement unit 600 will be described below.

Figure 7:
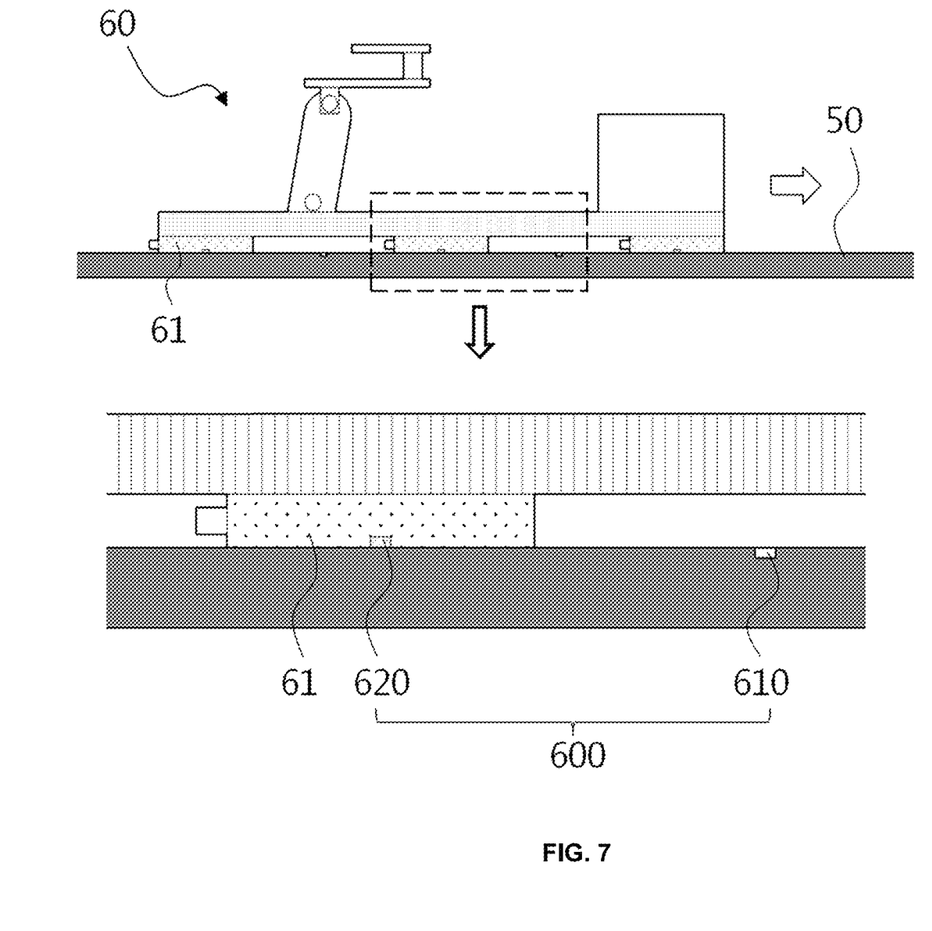
FIGS. 7 and 8 are cross-sectional views each illustrating an example of a lubrication-state measurement unit of the wireless communication-based system for managing a lubricating oil injection apparatus according to the fourth embodiment of the present invention.
Figure 8:
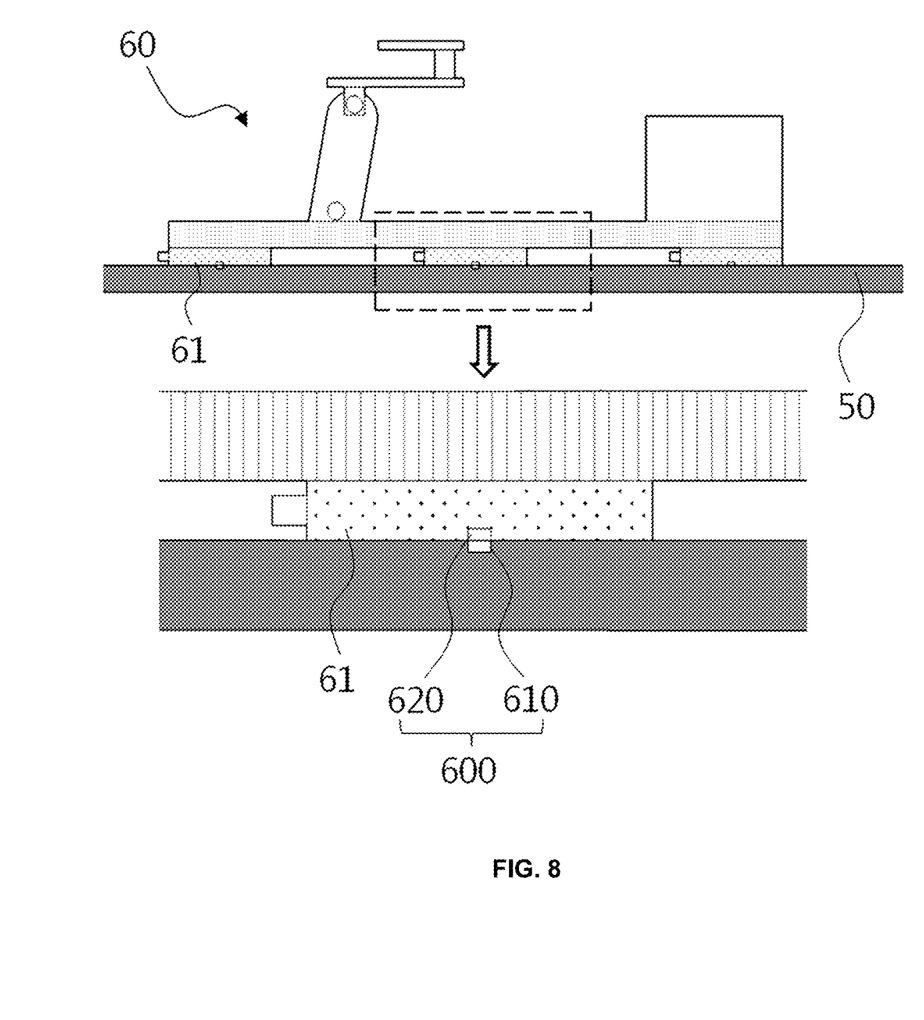

FIGS. 7 and 8 are cross-sectional views each illustrating an example of the lubrication-state measurement unit 600 that checks the lubrication state of the portion of the industrial mechanical apparatus where friction occurs by using the electric conductivity.

As illustrated in FIGS. 7 and 8, the industrial mechanical apparatus may be a transportation apparatus 60 moving along a rail 50. A guide block 61 is formed on a lower surface of the transportation apparatus 60, and the rail 50 is inserted into the guide block 61. The lubrication-state measurement unit 600 checks lubrication states of respective borders of the rail 50 and the transportation apparatus 60, and the lubricating oil injection apparatus 100 injects lubricating oil according to the lubrication states checked by the lubrication-state measurement unit 600, of the respective borders of the rail 50 and the transportation apparatus 60.

As illustrated in FIGS. 7 and 8, the lubrication-state measurement unit 600 includes a first electrode 610, a second electrode 620, and an electric conductivity measurement unit (not illustrated). The first electrode 610 and the second electrode 620 are formed on an upper surface of the rail 50 and a lower surface of the guide block 61, respectively, and check the lubrication states of the respective borders, respectively, of the rail 50 and the transportation apparatus 60. The electric conductivity measurement unit measures electric conductivity between the first electrode 610 and second electrode 620. More specifically, the first electrode 610 is installed on the rail 50 in such a manner as to be exposed to the outside, and the second electrode 620 is on the lower surface of the guide block 61 in such a manner as to be exposed to the outside.

As described above, the electric conductivity measurement unit measures the electrical conductivity between the first electrode 610 and the second electrode 620 and measures the lubrication states. Generally, oil is a fluid that has a large electrical resistivity, and electric current does not flow through pure oil. Lubricating oil may be made of pure oil or may be oil mixed with additives. Pure oil and oil mixed with additives both have large electrical resistivity. Therefore, in a case where lubricating oil in a normal state stays between the first electrode 610 and the second electrode 620, when the first electrode 610 and the second electrode 620 are brought into contact with each other, the electric conductivity is not measured, or is measured as low. In a state where lubricating oil is not additionally supplied for a long period of time and thus the existing lubricating oil is used up, the electric conductivity will be measured as comparatively high.

The electric conductivity measurement unit may measure the electric conductivity (hereinafter as reference electric conductivity) of the lubricating oil in the normal state using this property of lubricating oil and then may store the measured electric conductivity. Thereafter, the electric conductivity measurement unit may compare in real time the electric conductivity measured between the first electrode 610 and the second electrode 620 with the stored reference electric conductivity and may measure the lubrication states of the respective borders of the rail 50 and the transportation apparatus 60.

A distance between the first electrode 610 and the second electrode 620 varies with movement of the transportation apparatus 60. Therefore, in order to increase the precision of the electric conductivity that is to be measured, the electric conductivity measurement unit, as illustrated in FIG. 7, does not measure the electric conductivity when the first electrode 610 and the second electrode 620 are positioned a distance apart from each other. When the transportation apparatus 60 in FIG. 7 is moved rightward and only when the second electrode 620, as illustrated in FIG. 8, is thus brought into contact with an upper surface of the first electrode 610, the electric conductivity measurement unit may measure the electric conductivity and thus may check the lubrication states of the respective borders of the rail 50 and the transportation apparatus 60.

The rail 50 and the transportation apparatus 60 are only respective examples of a first member and a second member that are included in the industrial mechanical apparatus in which the first electrode 610 and the second electrode 620 of the lubrication-state measurement unit 600 according to the present invention are installed. The first member and the second member are not limited to the rail 50 and the transportation apparatus 60, respectively.

Information on the lubrication state of the industrial mechanical apparatus, which is transmitted from the lubrication-state measurement unit 600 to the user terminal 200, may be transmitted to the management server 300 through the user terminal 200. The management server 300 may store the received information on a per lubricating oil injection apparatus 100 basis and on a per industrial mechanical apparatus basis. The lubricating oil injection apparatus 100 here is installed in the industrial mechanical apparatus. Then, the management server 300 may utilize the stored information to manage the lubricating oil injection apparatus 100.

The present invention is not limited to the above-described embodiments and finds application in various fields. It is apparent to a person of ordinary skill in the art that various modifications would be made to the embodiments of the present invention within the scope that does not depart from the nature and gist of the present invention.

The present invention relates to a wireless communication-based system for managing a lubricating oil injection apparatus. In this wireless communication-based system for managing a lubricating oil injection apparatus, an operator can easily recognize a state of a lubricating oil injection apparatus that is installed for operation in an industrial mechanical apparatus and, at the same time, can easily control the lubricating oil injection apparatus, thereby maintaining the lubricating oil injection apparatus in an easier manner.

What is claimed is:
1. A wireless communication-based system for managing a lubricating oil injection apparatus, the wireless communication-based system comprising:
    a lubricating oil injection apparatus (100) being installed in an industrial mechanical apparatus and automatically operating in a situational manner, thereby injecting lubricating oil;
    a monitoring unit (110) being installed in the lubricating oil injection apparatus (100), checking a state of the lubricating oil injection apparatus (100), generating a first signal (1) containing information on the checked state of the lubricating oil injection apparatus (100), and transmitting the generated first signal (1) to the outside through wireless communication;
    a user terminal (200) receiving the first signal (1) from the monitoring unit (110), outputting the information on the checked state of the lubricating oil injection apparatus (100), the information being contained in the first signal (1), and transmitting the first signal (1) to the outside;

a management server (300) receiving the first signal (1) from the user terminal (200); and a database (400) receiving the first signal (1) from the management server (300) and storing the received first signal (1) on a per lubricating oil injection apparatus (100) basis, wherein the state checked by the monitoring unit (110), of the lubricating oil injection apparatus (100) indicates at least one of information on an amount of power remaining in a battery in the lubricating oil injection apparatus (100), a warning on overload on a motor in the lubricating oil injection apparatus (100), information on an amount of remaining lubricating oil, and an alert to finished supplying of lubricating oil, wherein the management server (300) predicts an estimated lubricating oil supplying interruption date for the lubricating oil injection apparatus (100) or an estimated complete discharging date for the battery using state information that is stored on a per lubricating oil injection apparatus (100) basis in the database (400) and transmits the predicted estimated lubricating oil supplying interruption date for the lubricating oil injection apparatus (100) or the predicted estimated complete discharging date for the battery to the user terminal (200).

2. The wireless communication-based system of claim 1, further comprising:

a first controller (210) being installed in the user terminal (200), generating a control signal (4) for operating the lubricating oil injection apparatus (100) according to a user's operation or a setting change signal (5) for changing a setting of the lubricating oil injection apparatus (100), and then transmitting the generated control signal (4) or the generated setting changing signal (5) to the lubricating oil injection apparatus (100); and a second controller (120) being installed in the lubricating oil injection apparatus (100), receiving the control signal (4) or the setting change signal (5) from the first controller (210) and operating the lubricating oil injection apparatus (100) or changing the setting of the lubricating oil injection apparatus (100), wherein the monitoring unit (110) generates history information on a control operation according to which the second controller (120) operates the lubricating oil injection apparatus (100) or information on completion of the changing of the setting of the lubricating oil injection apparatus (100) and including the history information or the information on the completion in the first signal (1).

3. The wireless communication-based system of claim 1, wherein the monitoring unit (110) and the user terminal (200) communicate with each other through one of Bluetooth, Zigbee, and Wireless Fidelity (Wi-Fi).

4. The wireless communication-based system of claim 1, wherein together with one of a warning on overload on a motor in the lubricating oil injection apparatus (100) or an alert to finished supplying of lubricating oil in the first signal (1), the monitoring unit (110) transmits a point in time at which each of the warning and the alert occurs and a time that elapses after each of the warning and the alert occurs.

5. The wireless communication-based system of claim 1, wherein in a case where the state information stored on a per lubricating oil injection apparatus (100) basis in the database (400) is not updated for a predetermined time, the management server (300) transmits to the user terminal (200) a second signal (2) alerting the user terminal (200) to the fact that the state information on a per lubricating oil injection apparatus (100) basis is not updated for the predetermined time.

6. The wireless communication-based system of claim 1, wherein the user terminal (200) recognizes a location of the lubricating oil injection apparatus (100) through intensity and a direction of a wireless communication signal that is transmitted and received to and from the lubricating oil injection apparatus (100) and outputs the recognized location of the lubricating oil injection apparatus (100).

7. The wireless communication-based system of claim 1, further comprising:

a signal generator (500) relaying the first signal (1) that is communicated between the monitoring unit (110) and the user terminal (200).

8. The wireless communication-based system of claim 7, wherein the lubricating oil injection apparatus (100) and the signal generator (500) communicate with each other through short-distance wireless communication, and the signal generator (500) and the user terminal (200) communicate with each other through short-distance wireless communication or the wireless Internet.

9. The wireless communication-based system of claim 7, wherein the signal generator (500) recognizes a location of the lubricating oil injection apparatus (100) through intensity and a direction of a short-distance wireless communication signal that is transmitted and received to and from the lubricating oil injection apparatus (100), generates a third signal (3) containing information on the recognized location of the lubricating oil injection apparatus (100), and transmits the generated third signal (3) to the user terminal (200).

10. The wireless communication-based system of claim 1, further comprising:

a lubrication-state measurement unit (600) being installed on a portion of an industrial mechanical apparatus, with friction occurring on the portion thereof, checking a lubrication state thereof, and transferring information on the checked lubrication state to the user terminal (200).

11. The wireless communication-based system of claim 10, wherein the lubrication-state measurement unit (600) detects one or more signals selected from among signals representing electric conductivity, noise, and vibration and checks the lubrication state of the portion of the industrial mechanical apparatus using the detected one or more signals, with the friction occurring on the portion thereof.

12. The wireless communication-based system of claim 11, wherein the lubrication-state measurement unit (600) comprises:

a first electrode (610) being installed on one of a first member and a second member which are included in the industrial mechanical apparatus, in such a manner as to be positioned a distance apart from each other, with friction occurring between the first and second members when the first and second members are brought into contact with each other;

a second electrode (620) being installed on one on which the first electrode (610) is not installed, of the first and second members and being situationally brought into contact with the first electrode (610); and an electric conductivity measurement unit measuring electric conductivity that is a flow of current between the first electrode (610) and the second electrode (620) when the first electrode (610) and the second electrode (620) are brought into contact with each other.

13. A wireless communication-based system for managing a lubricating oil injection apparatus, the wireless communication-based system comprising:
- a lubricating oil injection apparatus (100) being installed in an industrial mechanical apparatus and automatically operating in a situational manner, thereby injecting lubricating oil;
- a monitoring unit (110) being installed in the lubricating oil injection apparatus (100), checking a state of the lubricating oil injection apparatus (100), generating a first signal (1) containing information on the checked state of the lubricating oil injection apparatus (100), and transmitting the generated first signal (1) to the outside through wireless communication;
- a user terminal (200) receiving the first signal (1) from the monitoring unit (110), outputting the information on the checked state of the lubricating oil injection apparatus (100), the information being contained in the first signal (1), and transmitting the first signal (1) to the outside;
- a management server (300) receiving the first signal (1) from the user terminal (200); and
- a database (400) receiving the first signal (1) from the management server (300) and storing the received first signal (1) on a per lubricating oil injection apparatus (100) basis,
- wherein together with one of a warning on overload on a motor in the lubricating oil injection apparatus (100) or an alert to finished supplying of lubricating oil in the first signal (1), the monitoring unit (110) transmits a point in time at which each of the warning and the alert occurs and a time that elapses after each of the warning and the alert occurs.

* * * * *